United States Patent
Harada

(10) Patent No.: US 8,000,643 B2
(45) Date of Patent: Aug. 16, 2011

(54) LUBRICANT APPLICATOR, PROCESS CARTRIDGE AND IMAGE FORMING APPARATUS INCLUDING THE SAME

(75) Inventor: Hiroomi Harada, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 665 days.

(21) Appl. No.: 12/014,557

(22) Filed: Jan. 15, 2008

(65) Prior Publication Data
US 2008/0170897 A1 Jul. 17, 2008

(30) Foreign Application Priority Data
Jan. 16, 2007 (JP) ................ 2007-006557

(51) Int. Cl.
*G03G 21/00* (2006.01)
(52) U.S. Cl. ............ 399/346; 399/123; 184/17
(58) Field of Classification Search .......... 399/71, 399/123, 343, 345, 346; 184/14, 17, 99
See application file for complete search history.

(56) References Cited

U.S. PATENT DOCUMENTS

| | | | |
|---|---|---|---|
| 6,060,205 A * | 5/2000 | Takeichi et al. ............ 430/126.2 |
| 7,123,857 B2 | 10/2006 | Harada et al. |
| 7,263,308 B2 | 8/2007 | Harada et al. |
| 2004/0126134 A1 | 7/2004 | Harada et al. |
| 2005/0025520 A1* | 2/2005 | Murakami et al. ............ 399/111 |
| 2005/0063728 A1 | 3/2005 | Harada et al. |
| 2006/0056892 A1 | 3/2006 | Harada |
| 2007/0059067 A1 | 3/2007 | Tanaka et al. |
| 2007/0068738 A1 | 3/2007 | Kawahara et al. |
| 2007/0172273 A1 | 7/2007 | Harada et al. |
| 2007/0183824 A1 | 8/2007 | Suda et al. |
| 2007/0196123 A1 | 8/2007 | Mizuishi et al. |
| 2008/0013998 A1 | 1/2008 | Kumagai et al. |

FOREIGN PATENT DOCUMENTS

| JP | 9-62163 | 3/1997 |
|---|---|---|
| JP | 2859646 | 12/1998 |
| JP | 2000-75752 | 3/2000 |
| JP | 2000-162881 | 6/2000 |
| JP | 2002-244485 | 8/2002 |
| JP | 2002-351287 | 12/2002 |

* cited by examiner

*Primary Examiner* — David P Porta
*Assistant Examiner* — Benjamin Schmitt
(74) *Attorney, Agent, or Firm* — Oblon, Spivak, McClelland, Maier & Neustadt, L.L.P.

(57) ABSTRACT

An image forming apparatus includes a lubricant applicator and a process cartridge using the same. The lubricant applicator includes a solid lubricant, a lubricant retainer, a lubricant holder, a lubricant application mechanism, a pressure mechanism, a friction resistance reduction mechanism. The lubricant retainer holds the solid lubricant. The lubricant holder stores the solid lubricant and the lubricant retainer. The lubricant application mechanism applies the solid lubricant to an object. The pressure mechanism is provided between the lubricant retainer and the lubricant holder, and presses the lubricant retainer to push the solid lubricant from the lubricant holder. The friction resistance reduction mechanism is disposed at a position where the lubricant retainer and the lubricant holder come into contact in a frictionally sliding manner. The friction resistance reduction mechanism includes a protrusion provided on at least one of a surface of the lubricant retainer and an inner wall of the lubricant holder.

13 Claims, 9 Drawing Sheets

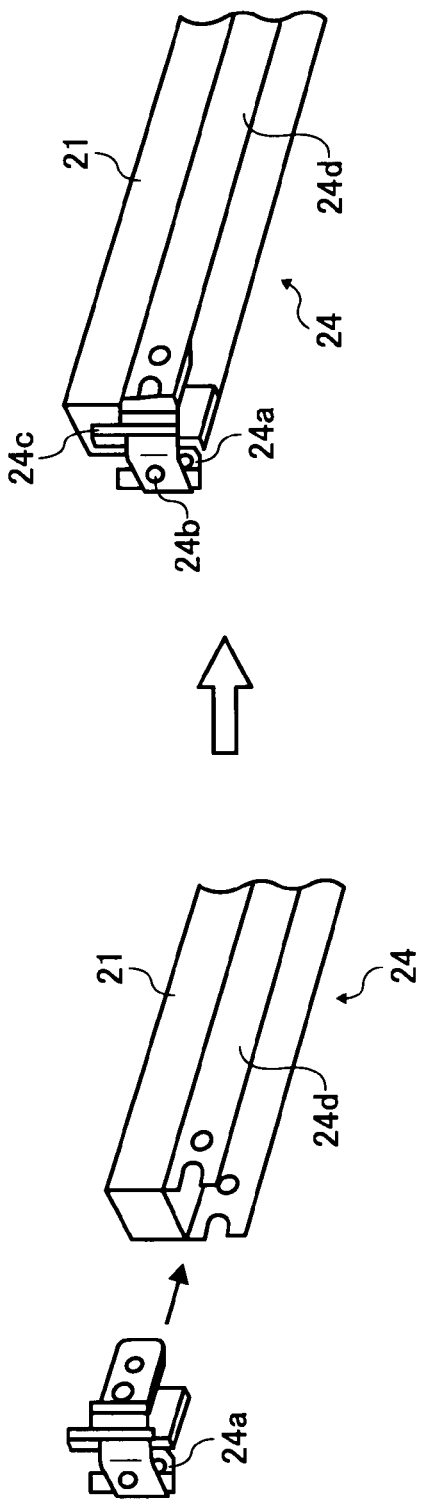
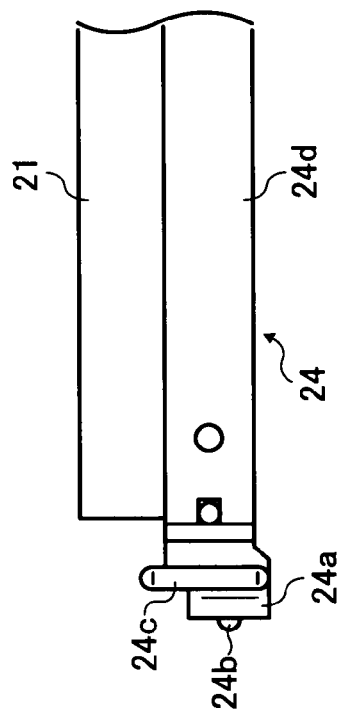
FIG. 5A
FIG. 5B

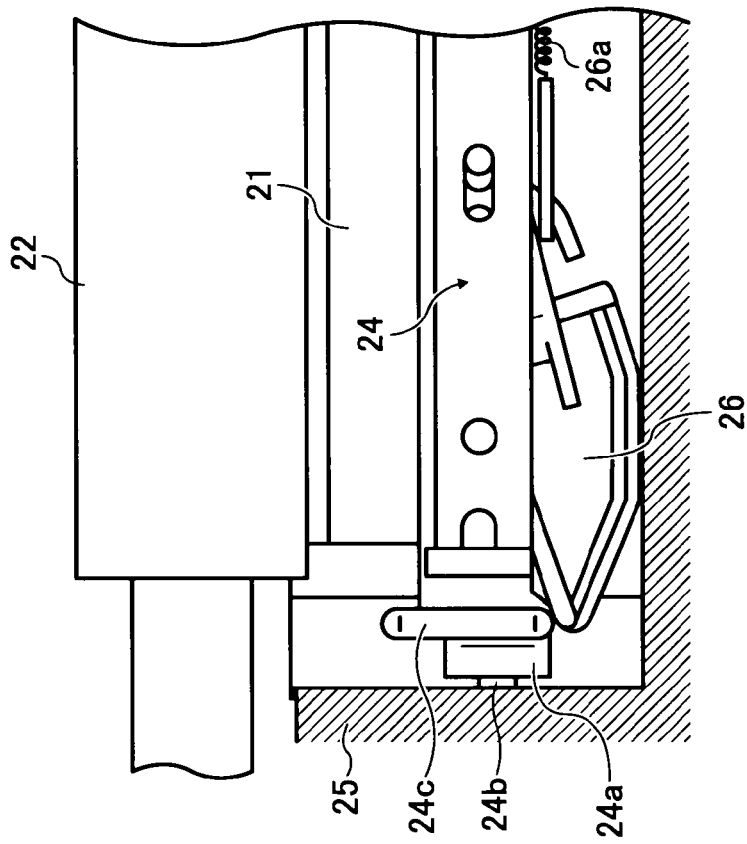
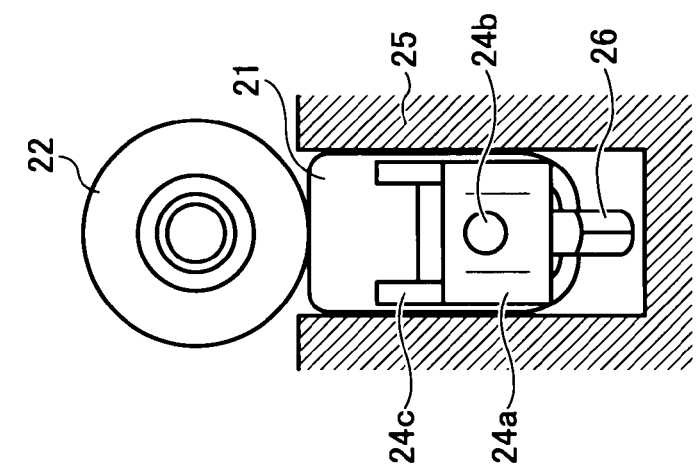

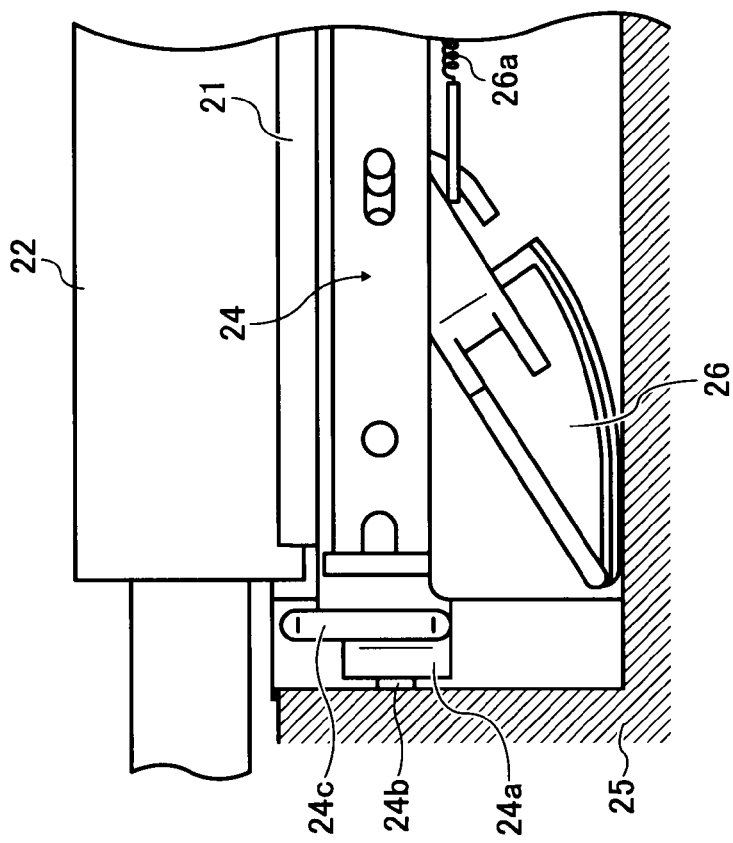
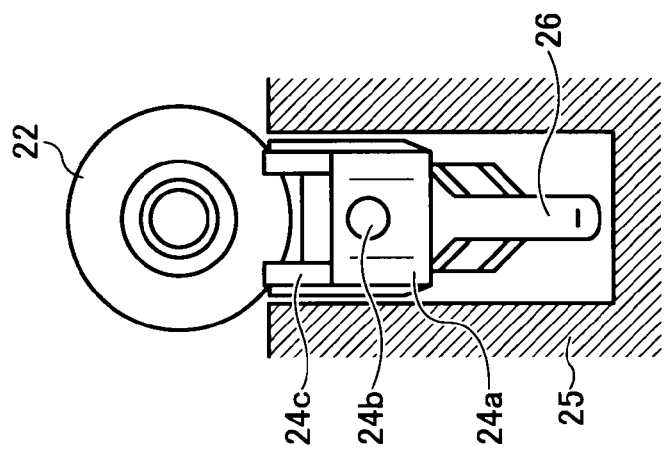

LUBRICANT APPLICATOR, PROCESS CARTRIDGE AND IMAGE FORMING APPARATUS INCLUDING THE SAME

CROSS-REFERENCE TO RELATED APPLICATIONS

The present patent application is based on and claims priority under 35 U.S.C. §119 upon Japanese Patent Application No. 2007-006557 filed on Jan. 16, 2007 in the Japan Patent Office, the entire contents of which are hereby incorporated herein by reference.

BACKGROUND OF THE INVENTION

1. Field of the Invention

Exemplary aspects of the present invention generally relate to an image forming apparatus, and more particularly, to an image forming apparatus that includes a lubricant applicator and a process cartridge using the same.

2. Description of the Background Art

An image forming process performed by an image forming apparatus using an electrophotographic method includes forming an electrostatic latent image on a photoreceptor serving as an image carrier through photoconductive development and adhering toner particles of colors corresponding to the electrostatic latent image using electrostatic force.

Such an electrophotographic image forming apparatus is generally equipped with a lubricant applicator that applies a lubricant to a surface of the photoreceptor, which is the main device for forming an image. The lubricant applicator is used in the image forming apparatus in an attempt to solve a problem that arises, for example, when a cleaning brush or a cleaning blade removes the toner adhering to the surface of the photoreceptor after image transfer.

Product life of the photoreceptor and an intermediate transfer belt depends on a level of deterioration due to mechanical friction with the cleaning brush and the cleaning blade. Therefore, in an effort to enhance the product life, the lubricant is applied to the surface of the photoreceptor and the intermediate transfer belt so that a friction coefficient can be reduced, thereby suppressing abrasion and thus extending photoreceptor product life.

In addition, the reduction of the friction coefficient of the photoreceptor surface eases removal of the toner residue adhering to the photoreceptor surface.

In other words, applying the lubricant to the photoreceptor surface makes it easier for the cleaning brush or the cleaning blade to remove the residual toner adhering to the photoreceptor or the intermediate transfer belt surface after a transfer process. Here, "residual toner" refers to that toner which has not been transferred to a recording medium or the like during the transfer process but remains on the photoreceptor or the intermediate transfer belt.

In recent years, a toner consisting of spherical particles produced by polymerization has come to be widely used. An advantage of such spherical toner is its uniform particle size distribution, which makes it possible to effectively reduce the particle size. As a result, image quality can be enhanced.

On the other hand, there is a drawback to such a toner. That is, the small size of the toner particles makes removal or cleaning of the residual toner from the photoreceptor difficult.

In light of the above, a technology that uses the lubricant applicator for applying the lubricant on the photoreceptor surface to improve cleaning of the photoreceptor becomes more important.

The lubricant is applied to the photoreceptor surface little by little in powder form. Specifically, as disclosed in Japanese Patent Laid-Open Application No. 2000-162881, a block-form lubricant is scraped and applied by an applicator such as a brush or the like.

As disclosed in Patent Publication No. 2859646, the lubricant can be supplied to the photoreceptor by externally adding the lubricant to the toner. However, where the lubricant is externally added to the toner and supplied to the photoreceptor, an amount supplied depends on an output image area. Consequently, it is difficult to stably supply the lubricant to an entire surface of the photoreceptor.

In terms of stably supplying the lubricant to the entire surface of the photoreceptor, a method in which a brush is used to scrape a solid lubricant that the brush then applies is preferable.

When the lubricant is applied to the photoreceptor surface, it is important to regulate both the amount and the state of the lubricant thus applied in order to prevent abrasion and enhance cleaning. For example, when lubricity is considered important, a certain amount of lubricant may be continuously supplied.

However, when the amount supplied becomes excessive, the excess lubricant may contaminate nearby devices such as a developing unit. Consequently, a charging amount of the toner may not be properly regulated.

Furthermore, in order to satisfy recent demand for a reduction of the size of a copier and a printer, the reduction of the size of components is important. Thus, it is preferable to minimize the size of the solid lubricant so that it is not larger than necessary.

Accordingly, several attempts have been made to regulate application of the lubricant on the photoreceptor. For example, a related art that regulates an application state of the lubricant applied to the photoreceptor serving as an image carrier is disclosed in Japanese Patent Laid-Open Application Hei-9-62163, which discloses ways in which a pressure of the solid lubricant on the photoreceptor and a linear velocity of an application brush contacting the solid lubricant are controlled.

Similarly, Japanese Patent Laid-Open Application 2000-75752 discloses ways in which an applied amount of the lubricant per unit of rotation of the photoreceptor is determined, and Japanese Patent Laid-Open Application 2002-244485 discloses ways in which a number of rotations of the lubricant application brush is regulated according to image forming information.

Furthermore, Japanese Patent Laid-Open Application 2002-351287 discloses an image forming apparatus which replaceably includes various kinds of engine units each having a nonvolatile memory and different functions so that a user does not need to repurchase the whole image forming apparatus when the user wishes to change only a performance of the image forming apparatus.

Such an image forming apparatus further includes a control mechanism that controls the performance of the image forming apparatus based on stored information of a storage mechanism in the engine unit mounted to the image forming apparatus. The user may change the performance characteristics of the apparatus, such as recording speed, resolution, and so forth, by replacing the engine unit with an engine unit with different performance characteristics without changing the main body of the image forming apparatus.

However, the above-described related arts do not indicate ways to improve sliding between a lubricant support member for supporting the lubricant in the lubricant applicator and a lubricant holder for storing the lubricant.

Consequently, there is such a problem that the solid lubricant cannot be pressed against the lubricant application brush, and thus the amount of the lubricant applied to the image carrier surface fluctuates.

When the amount of the lubricant applied fluctuates and is excessive, the nearby charging unit or other devices disposed nearby may easily be contaminated. On the other hand, when the applied amount of the lubricant is inadequate, the toner adheres to the image carrier surface and a phenomenon called filming may easily occur.

SUMMARY

In view of the foregoing, exemplary embodiments of the present invention provide an image forming apparatus that includes a lubricant applicator and a process cartridge using the same.

In one exemplary embodiment, a lubricant applicator includes a solid lubricant, a lubricant retainer, a lubricant holder, a lubricant application mechanism, a pressure mechanism, and a friction resistance reduction mechanism. The lubricant retainer holds the solid lubricant. The lubricant holder stores the solid lubricant and the lubricant retainer. The lubricant application mechanism applies the solid lubricant to an object. The pressure mechanism is provided between the lubricant retainer and the lubricant holder, and presses the lubricant retainer so as to push the solid lubricant from the lubricant holder. The friction resistance reduction mechanism is disposed at a position where the lubricant retainer and the lubricant holder come into contact in a frictionally sliding manner.

Another exemplary embodiment provides a process cartridge detachably mountable to an image forming apparatus. The process cartridge includes an image carrier, and integrally includes at least one of a charger, a developing mechanism, a cleaner, and the lubricant applicator. The image carrier includes a surface that bears an electrostatic latent image. The charger charges the surface of the image carrier. The developing mechanism supplies toner to the electrostatic latent image on the surface of the image carrier so as to form a visible image. The cleaner recovers a residual toner remaining on the surface of the image carrier after transfer.

Yet another exemplary embodiment provides an image forming apparatus that includes the image carrier, the charger, the exposure unit, the developing mechanism, the transfer unit, the cleaner, and at least one of the lubricant applicator and the process cartridge.

Additional features and advantages of the present invention will be more fully apparent from the following detailed description of exemplary embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein:

FIGS. 5A-5D are schematic diagrams illustrating a lubricant retainer according to an exemplary embodiment;

FIGS. 6A-6C are schematic diagrams illustrating the lubricant applicator according to an exemplary embodiment; and FIGS. 7A-7C are schematic diagrams illustrating the lubricant applicator according to an exemplary embodiment.

DETAILED DESCRIPTION OF EXEMPLARY EMBODIMENTS

Figure 1:
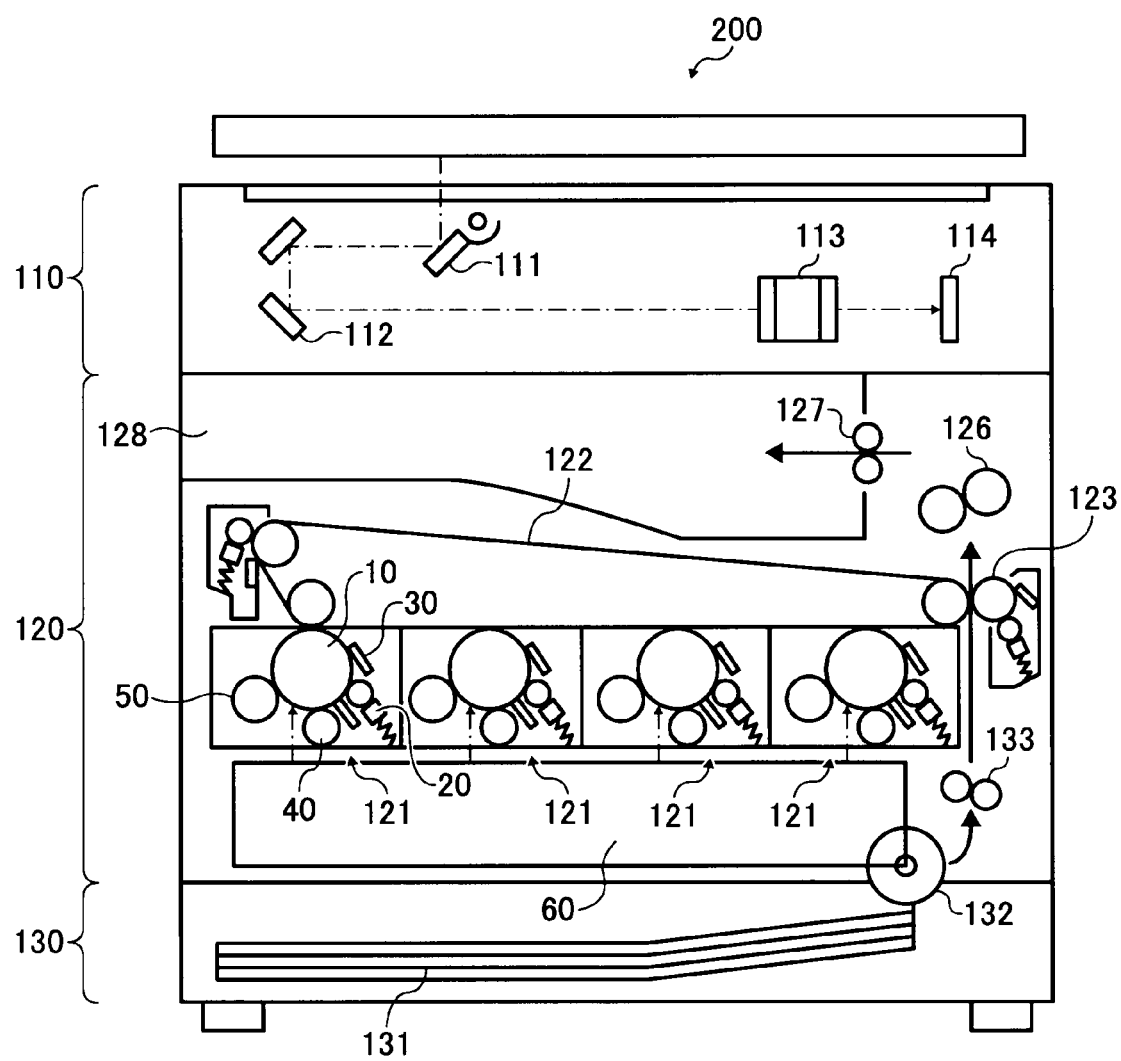
FIG. 1 is a schematic diagram illustrating an image forming apparatus, according to an exemplary embodiment of the present invention.

It will be understood that if an element or layer is referred to as being "on," "against," "connected to" or "coupled to" another element or layer, then it can be directly on, against connected or coupled to the other element or layer, or intervening elements or layers may be present.

In contrast, if an element is referred to as being "directly on", "directly connected to" or "directly coupled to" another element or layer, then there are no intervening elements or layers present. Like numbers refer to like elements throughout.

As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures.

For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms.

These terms are used only to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Exemplary embodiments of the present invention are now explained below with reference to the accompanying drawings.

In the later-described comparative example, exemplary embodiment, and alternative example, for the sake of simplicity of drawings and descriptions, the same reference numerals will be given to constituent elements such as parts and materials having the same functions, and the descriptions thereof will be omitted unless otherwise stated.

Typically, but not necessarily, paper is the medium from which is made a sheet on which an image is to be formed. Other printable media is available in sheets and their use here is included.

For simplicity, this Detailed Description section refers to paper, sheets thereof, paper feeder, etc. It should be understood, however, that the sheets, etc., are not limited only to paper.

Referring now to the drawings, wherein like reference numerals designate identical or corresponding parts throughout the several views thereof, in the first instance to FIG. 1, an image forming apparatus equipped with a lubricant applicator according to one exemplary embodiment of the present invention is described.

FIG. 1 is a schematic diagram illustrating the image forming apparatus including the lubricant applicator according to the exemplary embodiment. In FIG. 1 an image forming apparatus 200 is an image forming apparatus that forms a full-color image. The image forming apparatus 200 at least includes a scanner 110, an image forming unit 120 and a sheet feeder 130.

In the scanner 110 there are provided a first scanning carriage 111, a second scanning carriage 112, an imaging lens 113, and a read sensor 114. In the image forming unit 120 there are provided four process cartridges 121 for yellow, cyan, magenta and black, an endless intermediate transfer belt 122, a secondary transfer roller 123, and toner bottles, not shown, to supply toners of different colors to the respective process cartridges 121.

Each of the process cartridges 121 includes a photoreceptor 10. Surrounding the photoreceptor 10 are a lubricant applicator 20, a cleaning unit 30, a charger 40, and a developing unit 50.

The intermediate transfer belt 122 is disposed above the photoreceptors 10 of the process cartridges 121. A scan surface of the bottom of the intermediate transfer belt 122 comes into contact with a peripheral surface of the photoreceptors 10. The toner images of different colors formed on the surfaces of the respective photoreceptors 10 are transferred onto the intermediate transfer belt 122 serving as a transfer member.

Figure 2:
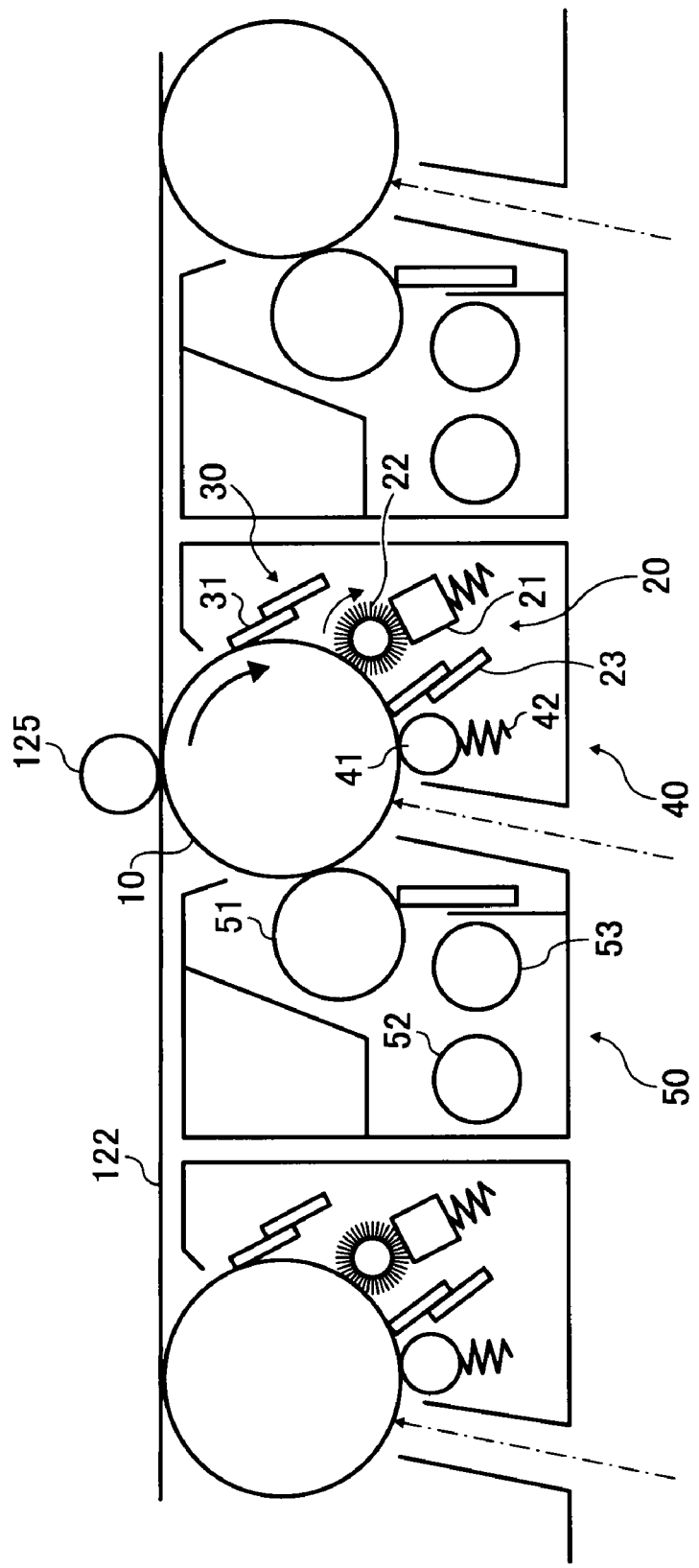
FIG. 2 is a cross-sectional view illustrating a process cartridge including a lubricant applicator according to an exemplary embodiment of the present invention.

As shown in FIG. 2, a primary transfer roller 125 is disposed across from the photoreceptor 10. The intermediate transfer belt 122 is nipped between the primary transfer roller 125 and the photoreceptor 10.

The toner images of different colors are formed on each of the respective photoreceptors 10. Except for the color of the toner images, the structure that allows the toner images of different colors to be transferred onto the intermediate transfer belt 122 is essentially similar if not identical for all the process cartridges 121.

In FIG. 1, beneath the process cartridges 121 is disposed an exposure unit 60 which irradiates a charged image carrier surface with a laser beam based on image information, thereby forming an electrostatic latent image thereon.

The lubricant applicator 20 which applies a lubricant to each surface of the intermediate transfer belt 122 and the secondary transfer roller 123 is provided on the process cartridge 121. The cleaning unit 30 is disposed in the vicinity of the lubricant applicator 20.

The sheet feed unit 130 includes a sheet feed cassette 131 and a sheet feed roller 132. The sheet feed cassette 131 stores a plurality of transfer sheets serving as a recording medium. The sheet feed roller 132 sends out the transfer sheet to the nip formed between the intermediate transfer belt 122 and the secondary transfer roller 123 via registration rollers 133.

Furthermore, at an exit of the secondary transfer roller 123 is provided a fixing unit 126. Downstream of the fixing unit 126 in an arrow direction are disposed a sheet discharge roller 127 and a discharged sheet storage unit 128 that stores the discharged recording sheet.

Referring now to FIG. 2 there is provided an enlarged view illustrating the process cartridge 121 of FIG. 1. In FIG. 2, the process cartridge 121 includes the photoreceptor 10, the lubricant applicator 20, the cleaning unit 30, the charger 40, and the developing unit 50. The lubricant applicator 20, the cleaning unit 30, the charger 40, and the developing unit 50 are disposed around the photoreceptor 10.

In the cleaning unit 30, a cleaning blade 31 which comes into contact with the surface of the photoreceptor 10 is disposed. The cleaning blade 31 is configured to recover a residual toner or the like that remains on the surface of the photoreceptor 10, and cleans the surface thereof.

The lubricant applicator 20 includes a solid lubricant 21, a lubricant application brush roller 22, a lubricant application blade 23, and a bias mechanism, not shown. The lubricant application brush roller 22 serves as a lubricant application mechanism that rotates while contacting both the solid lubricant 21 and the photoreceptor 10. The bias mechanism presses the solid lubricant 21 relative to the lubricant application brush roller 22.

The lubricant application brush roller 22 scrapes the solid lubricant 21, thereby obtaining the lubricant in powder form. The lubricant application brush roller 22 applies the lubricant in powder form to the surface of the photoreceptor 10.

The lubricant application blade 23 regulates a thickness of the lubricant applied to the surface of the photoreceptor 10.

The charging unit 40 includes a charging roller 41 and a pressure mechanism 42. The charging roller 41 is disposed to come into contact with the photoreceptor 10. The pressure mechanism 42 is configured to cause the charging roller 41 to come into contact with the photoreceptor 10. The charging roller 41 evenly charges the surface of the photoreceptor 10.

The developing unit 50 includes a developing roller 51, a mixing roller 52, and a supply roller 53. The developing roller 51 forms a visible image by supplying the toner serving as a developing agent to an electrostatic latent image on the surface of the photoreceptor 10. The mixing roller 52 mixes the developing agent stored in a developing agent storage unit. The supply roller 53 supplies the agitated and mixed developing agent to the developing roller 51.

The primary transfer roller or a transfer bias roller 125 is disposed at a position across from the photoreceptor 10 nipping the intermediate transfer belt 122 therebetween.

Figure 3:
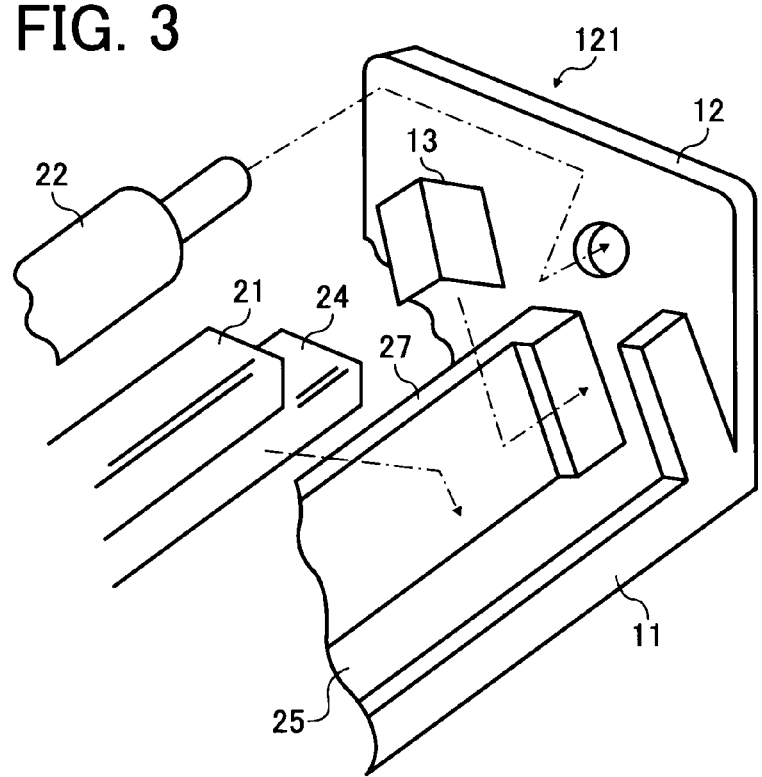
FIG. 3 is a partial exploded view illustrating the process cartridge of FIG. 2 according to an exemplary embodiment.
Figure 4:
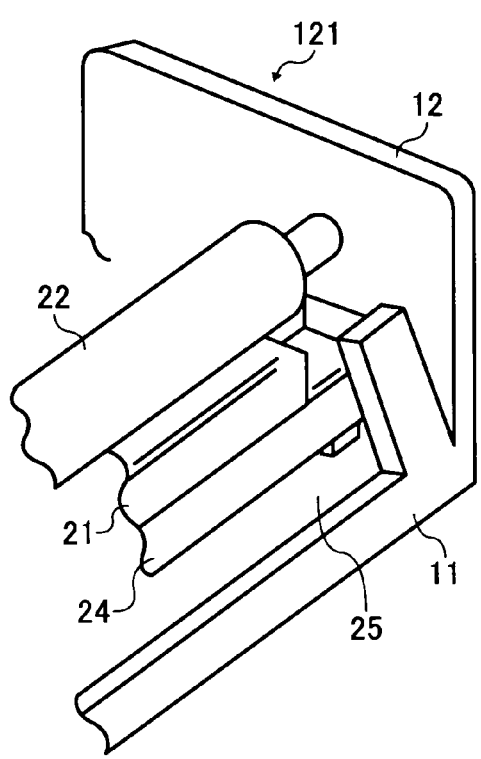
FIG. 4 is a partial enlarged view illustrating the process cartridge according to an exemplary embodiment.

Referring now to FIG. 3, there is provided a partially enlarged assembly diagram illustrating the process cartridge 121. FIG. 4 is a partial enlarged view illustrating the process cartridge 121 after assembly.

In FIG. 3, a lubricant holder 25 is formed on a frame member 11 of the process cartridge 121 including side walls 12. The lubricant holder 25 stores the solid lubricant 21 together with a lubricant retainer 24.

A bias mechanism that causes the solid lubricant 21 to come into contact with the brush roller 22 serving as the lubricant application mechanism is provided on the bottom surface of the lubricant retainer 24 opposite the surface on which the lubricant is placed. A description will be provided of the bias mechanism later.

The frame member 11 including the lubricant holder 25 is formed of a material, for example, a polycarbonate resin, mixed with a filler as a curing agent. The lubricant holder 25 has an elongated rectangular box shape.

A short side of the box-shape lubricant holder 25 and a portion of an inner wall 27 downstream of the rotary direction of the lubricant application brush roller 22 connecting to the short side of the lubricant holder 25 are covered with a guide member 13 panel made of stainless steel. The stainless steel panel is hereinafter referred to as an SUS panel.

The guide member 13 is configured to reduce a friction resistance of an abrading portion between the lubricant retainer 24 and the inner surface of the lubricant holder 25. An end portion, which is a cut portion, a so-called burr surface of the SUS guide member 13 faces the inner surface of the lubricant holder 25, for example. Accordingly, it is possible to avoid a slide failure of the lubricant retainer 24 caused by the burr.

In FIG. 4, the solid lubricant 21 held by the lubricant retainer 24 is stored in the lubricant holder 25 of the frame 11 including the side walls 12. The solid lubricant 21 is pressed by the not-shown bias mechanism against the lubricant application brush roller 22, which is rotatively held between the side walls 12.

A description will be given of exemplary aspects of the present invention with reference to FIGS. 5A-5D and 6A-6C. FIGS. 5A through 5D are schematic diagrams illustrating the lubricant retainer 24 of the lubricant applicator according to the exemplary embodiment of the present invention.

Figure 5C:
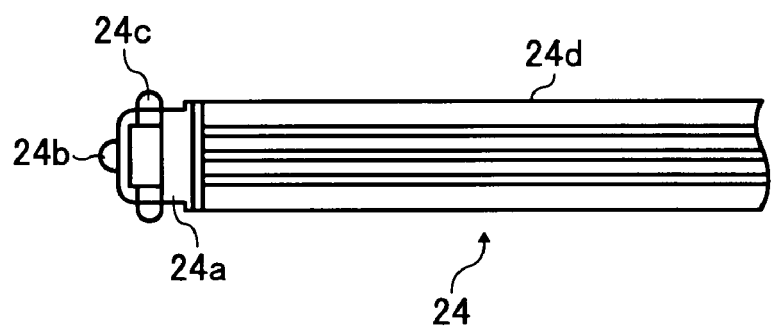
Figure 5D:
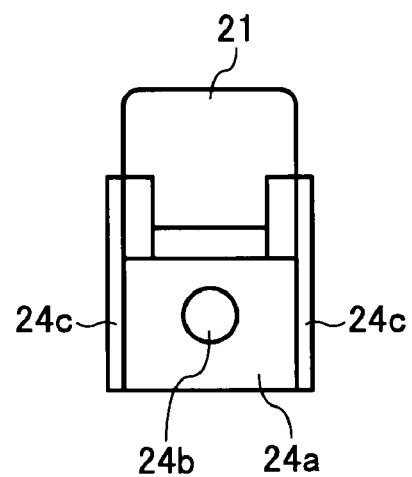

FIG. 5A is a perspective view illustrating an end portion of the lubricant retainer 24. FIG. 5B is a side view illustrating the end portion thereof. FIG. 5C is a rear view illustrating the end portion thereof. FIG. 5D is a front view illustrating the end portion thereof. In FIGS. 5A through 5D, for ease of description only, one end of the lubricant retainer 24 is shown and the other end is omitted.

As shown in FIGS. 5A through 5D, the lubricant retainer 24 includes a main body (hereinafter referred to as a lubricant carrier) 24d made of a metal, for example, a zinc-treated steel plate, and resin members 24a serving as an abrading member, each fitted to each end portion of the lubricant carrier 24d and made of, for example, a polyacetal resin.

When the resin member 24a is made of a resin such as the polyacetal resin, flexibility of shaping upon molding can be enhanced, and moreover, the slidability between the lubricant holder 25 and the resin member 24a can be enhanced.

Each resin member 24a serves as an abrading member that is brought into contact with the inner wall of the lubricant holder 25 in a frictionally sliding manner. According to the exemplary embodiment, the resin member 24a is snap-fitted to each end of the lubricant carrier 24d so that the resin member 24a can be easily detached, thereby making it possible to accommodate re-use or recycling.

Alternatively, however, the resin member 24a or the abrading member may be fitted to the lubricant carrier 24d by bonding or press-fitting, for example, thermal caulking or sealing using a two-sided tape or hot-melting.

As shown in FIGS. 5A through 5D, at the end surface of the resin member 24a is disposed a protruding member 24b having a hemispherical shape serving as a friction resistance reduction mechanism.

Semicylindrical protruding members 24c serving as a friction resistance reduction mechanism are each disposed at the side surfaces of the resin member 24a. Each semicylindrical protruding member 24c extends in a ridge-like line in a sliding direction, that is, toward the bottom of the lubricant holder 25.

The protruding member 24b serving as the friction resistance reduction mechanism disposed at the end surface of the resin member 24a is configured to support the lubricant retainer 24 in a shaft direction. The protruding member 24b does not directly affect an application position of the lubricant 21. Therefore, the protruding member 24b is point-contacted against the inner wall of the lubricant holder 25 in order to reduce the friction resistance.

On the other hand, the protruding members 24c serving as the friction resistance reduction mechanism each disposed on the side surfaces of the resin member 24a directly affect the application position of the lubricant 21. Therefore, the protruding members 24c have their semicylindrical shape so that the protruding members 24c contact in line with the inner wall of the lubricant holder 25. Accordingly, the lubricant 21 is stably supported without a tilt.

Similar to the protruding member 24b provided on the end surface of the resin member 24a, when the friction resistance reduction mechanism at the side surfaces of the resin member 24a has a protruding shape point-contacted with the inner wall of the lubricant holder 25, the lubricant retainer 24 may easily tilt.

Consequently, a contact angle between an upper surface of the lubricant 21 held by the lubricant retainer 24 and the lubricant application brush roller 22 is not stable, causing the lubricant 21 to be unevenly worn and the amount applied to become unreliable.

On the other hand, similar to the friction resistance reduction mechanism on the side surfaces of the resin member 24a, when the friction resistance reduction mechanism on the end surface of the resin member 24a has a semicylindrical protruding shape, the friction resistance reduction effect is deteriorated.

Therefore, according to the exemplary embodiment, in order to reduce the friction resistance between the lubricant retainer 24 and the inner wall of the lubricant holder 25 while securing a stable position for the lubricant 21 over time, the protruding members 24c extending for a predetermined length of the friction resistance reduction portion and having the semicylindrcal shape are each provided on the side surfaces of the resin member 24a.

Particularly as shown in FIG. 5B, the protruding member 24c disposed on one side surface of the lubricant retainer 24 is disposed at a position outside the end portion of the solid lubricant 21 (on the left in FIG. 5B).

In other words, two semicylindrical protruding portions 24c disposed on one side surface of the lubricant retainer 24 are disposed outside each end portion of the solid lubricant 21.

The distance between the semicylindrical protruding portions 24c at one end of the solid lubricant 21 and the semicylindrical protruding portions 24c at the other end of the lubricant 21 is longer than the solid lubricant 21 and the lubricant application brush roller 22 having a similar if not the same length as the solid lubricant 21.

Accordingly, where the solid lubricant 21 is consumed, and thus the lubricant retainer 24 approaches the application brush roller 22, the semicylindrical protruding members 24c prevent the lubricant retainer 24 from colliding with the lubricant application brush roller 22, thereby preventing uneven application of the lubricant.

Furthermore, the lubricant being scraped and formed into powder by the lubricant application brush roller 22 can be prevented from being caught in the abrading portion between the lubricant retainer 24 and the inner wall of the lubricant holder 25, thereby ensuring smooth abrasion.

The upper end portion of the semicylindrical protruding members 24c extends beyond the upper surface of the lubricant retainer 24. Accordingly, both ends, or the left and right sides, of the lubricant retainer 24 are held by the semicylindrical protruding members 24c having always the predetermined length.

Thus, the position of the lubricant retainer 24 faces the lubricant application brush roller 22 without a tilt. Therefore, the solid lubricant 21 is evenly consumed, and the amount of the lubricant applied to the surface of the photoreceptor 10 is stabilized.

According to the exemplary embodiment, when the length of the lubricant retainer 24 is, for example, 320 mm, the height is 6 mm, and the width is 8 mm, a diameter of the protruding member 24b having the hemispherical shape provided on the each end surface of the lubricant retainer 24 is 2 mm, and its protruding height is 0.5 mm. The semicylindrical protruding portion 24c has a width of 2 mm, a length of 9 mm, and the protruding height is 0.5 mm. It should be noted that that these dimensions are purely illustrative and not intended to be exhaustive, and accordingly, the invention is not limited precisely thereto.

When the resin member 24a is formed through injection molding, it is preferable that the protruding members 24b and 24c be integrally formed with the resin member 24a which is fitted to each end portion of the lubricant carrier 24d. Accordingly, the molding process can be simplified, thereby achieving a reduction in manufacturing costs.

FIGS. 6A through 6C, and FIGS. 7A through 7C, are diagrams illustrating the solid lubricant 21 stored in the lubricant holder 25 along with the lubricant retainer 24.

Figure 6A:
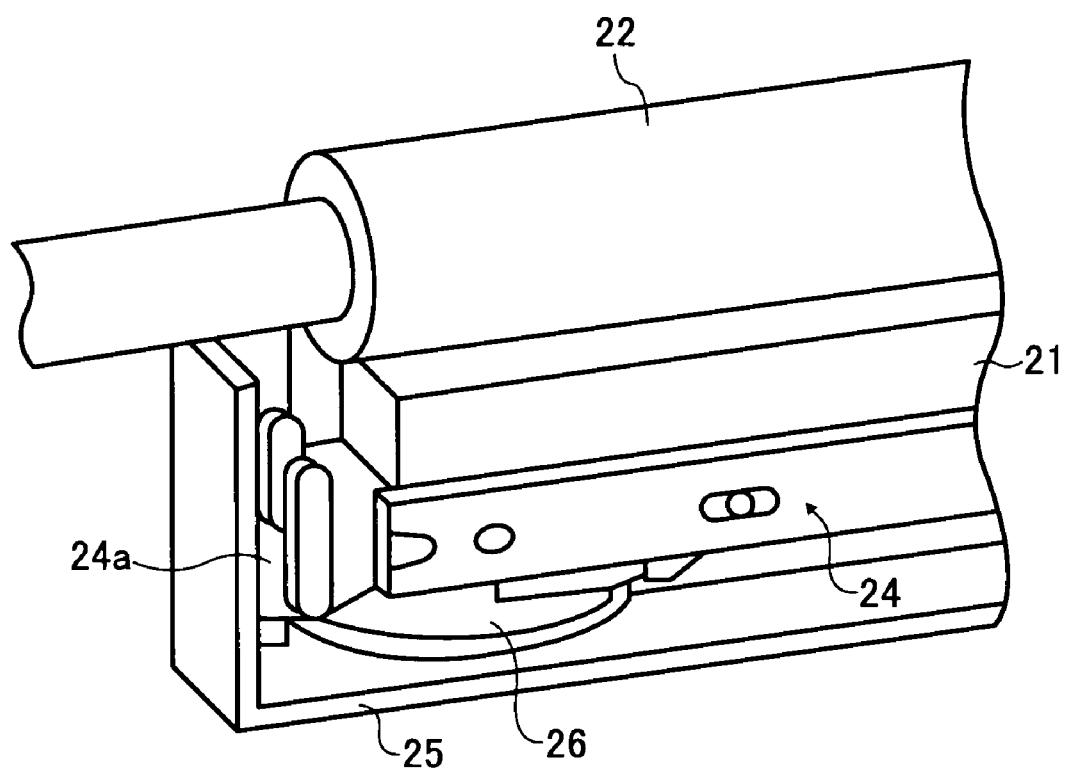
Figure 7A:
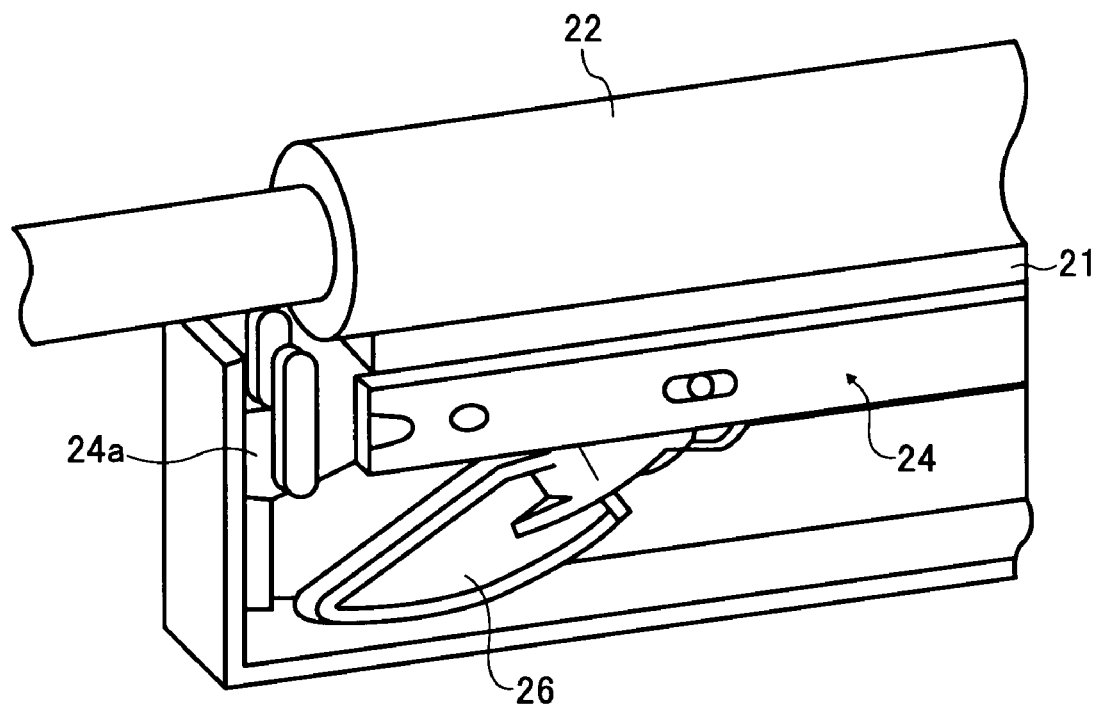

FIG. 6A and FIG. 7A are partial perspective views. FIG. 6B and FIG. 7B are cross-sectional views along a direction perpendicular to the length of the lubricant retainer 24. FIG. 6C and FIG. 7C are partial cross-sectional views along the length of the lubricant retainer 24. FIGS. 6A through 6C and FIGS. 7A through 7C illustrate one end of the lubricant retainer 24 and other associating devices. The description of the other end is omitted herein.

FIGS. 6A thorough 6C illustrate an initial state of an operation, that is, the initial state in which the solid lubricant 21 is used. FIGS. 7A through 7C illustrate a state after a predetermined time period since the start of operation has elapsed, that is, a state in which the solid lubricant 21 is consumed, and a small amount of the lubricant remains.

With reference to FIGS. 6A through 6C, and FIGS. 7A through 7C, a description is given of the bias mechanism which presses the solid lubricant 21 relative to the lubricant application brush roller 22 according to the exemplary embodiment.

In FIGS. 6A and 6C, a pair of cam members 26 is disposed with a predetermined gap between the cam members on a bottom surface opposite to the surface of the lubricant retainer 24 on which the solid lubricant 21 is mounted. One of two cam members 26 on the other side is omitted in FIG. 6A through 6C.

A spring member 26a, for example, a helical spring, is extended between the pair of cam members 26. In other words, the bias mechanism includes the pair of cam members 26 and the spring member 26a extended between the pair of cam members 26. Contraction of the spring member 26 acts to reduce the space between the cam members 26.

Consequently, when the solid lubricant 21 is consumed, the each cam member 26 is gradually lifted. When each cam member 26 is lifted, the bottom end portion of the cam members 26 presses against the bottom of the lubricant holder 25.

As a result, the solid lubricant 21 held by the lubricant retainer 24 is biased by the reactive force such that the solid lubricant 21 always comes into contact with the lubricant application brush roller 22 at a predetermined contact pressure.

FIGS. 6A through 6C illustrate the initial state of operation. Therefore, in FIGS. 6A through 6C, the solid lubricant 21 is hardly consumed, and the cam member 26 is hardly lifted.

On the other hand, FIGS. 7A through 7C illustrate a state in which the predetermined operation period has elapsed. In FIGS. 7A through 7C, when the solid lubricant 21 is consumed, the cam member 26 is lifted by the contraction of the spring 26a. When the cam member 26 is lifted, the lubricant retainer 24 together with the solid lubricant 21 move upward as shown in FIGS. 7A through 7C.

As a result, the pressure of the solid lubricant 21 against the lubricant application brush roller 22 is maintained at a similar if not identical level as that of FIGS. 7A through FIG. 7C.

When the lubricant retainer 24 moves upward along with the solid lubricant 21, the lubricant retainer 24 and the inner wall of the lubricant holder 25 are brought into contact in a frictionally sliding manner.

The protruding member 24b having the hemispherical shape is disposed on the end surface of the resin member 24a at the end of the lubricant retainer 24. Accordingly, each end surface of the lubricant retainer 24 is point-contacted with the end portion of the inner wall of the lubricant holder 25.

The semicylindrical protruding members 24c extending in a ridge-like line toward the bottom portion of the lubricant holder 25 are provided on the left and the right side surfaces of each resin member 24a fitted to each the end of the lubricant retainer 24. Accordingly, certain portions of the lubricant retainer 24 contact in line with the inner wall of the lubricant holder 25.

The hemispherical protruding member 24b and the semicylindrical protruding members 24c are symmetrically provided on the left and the right end portions of the lubricant retainer 24. Accordingly, the contact portion between the lubricant retainer 24 and the lubricant holder 25 is either a point-contact or a line-contact.

The friction resistance becomes relatively even and small in the longitudinal direction and the width direction of the lubricant retainer 24. Thus, the solid lubricant 21 evenly moves upward in FIGS. 6 and 7 when the solid lubricant 21 is consumed. The solid lubricant 21 comes into contact with the lubricant application brush roller 22 at an even pressure, and thus is evenly consumed.

Accordingly, the amount of the lubricant applied to the photoreceptor 10 is stabilized, and thus it is possible to reduce, if not prevent entirely, contamination of the parts disposed nearby due to the excess application of the lubricant.

Furthermore, it is possible to reduce, if not prevent entirely, generation of filming, in which the toner adheres to the surface of the photoreceptor 10 when the amount of the lubricant applied is inadequate.

A combination of the guide member 13 and the protruding members 24b and 24c provided on the lubricant retainer 24 and serving as the friction resistance reduction portions can enhance the effect described above.

The lubricant applicator 20, which includes the lubricant retainer 24 equipped with the protruding members 24b having the hemispherical shape and the protruding members 24c having the semicylindrical shape, both serving as the friction resistance reduction portions, is provided on the process cartridge, forming a portion of the process cartridge.

As shown in FIG. 2, the process cartridge may include the photoreceptor 10, and integrally include, for example, the cleaning unit 30, the charger 40 and the developing unit 50.

As shown in FIG. 1, such a process cartridge is installed in the image forming apparatus and used when an image forming operation takes place.

A description will now be given of the operation of the image forming apparatus including the process cartridge equipped with such a lubricant applicator described above.

Each photoreceptor 10 of the process cartridges 121 is rotatively driven in a clockwise direction in FIG. 1 and FIG. 2. The surface of the photoreceptor 10 is charged to a predetermined polarity by the charging roller 41 of the charger 40 to which a charging voltage is applied.

The charged photoreceptor 10 is irradiated with, for example, a laser beam emitted from the exposure unit 60 and optically modulated. Accordingly, an electrostatic latent image is formed on each surface of the photoreceptors 10.

Each electrostatic latent image is supplied with a respective color of developing agent by the developing roller 51 of the developing unit 50. Accordingly, the electrostatic latent images are rendered visible, and the toner images of different colors corresponding to each developing agent are formed.

Subsequently, with reference to FIG. 2, the primary transfer roller 125 is applied with a transfer voltage so as to primarily transfer the toner images on the photoreceptors 10 onto the rotating intermediate transfer belt 122. Accordingly, a color image as a composite image is formed.

The color image primarily transferred onto the intermediate transfer belt 122 is secondarily transferred to the recording sheet which is sent out from the sheet feed roller 132 of the sheet feed unit 130 at a predetermined timing and fed between the intermediate transfer belt 122 and the secondary transfer roller 123.

The recording sheet on which the color image is secondarily transferred is sent to the fixing unit 126 in which the heat and the pressure cause the color image on the recording sheet to be fixed onto the recording sheet.

After the color image is fixed on the recording sheet, the recording sheet is discharged to the discharged sheet storage unit 128. The cleaning blade 31 of the cleaning unit 30 recovers and removes the transfer residual toner remaining on the photoreceptor 10 after the toner image is transferred.

Subsequently, the lubricant applicator 20 applies the lubricant to the surface of the photoreceptor 10 after the photoreceptor 10 is cleaned. As shown in FIG. 6, the lubricant application brush roller 22 comes into contact with both the solid lubricant 21 stored in a frictionally sliding manner in the lubricant holder 25 and the photoreceptor 10, and rotates.

Accordingly, the lubricant application brush roller 22 scrapes the solid lubricant 21 and applies the lubricant in powder form to the surface of the photoreceptor 10.

Because the hemispherical-shape protruding members 24b are each provided on the end surface of the resin members 24a constituting the end portions of the lubricant retainer 24, and the semicylindrical-shape protruding members 24c are provided on the side surfaces of the resin member 24a, the lubricant retainer 24 is either point-contacted or line-contacted against the inner wall of the lubricant holder 25.

Therefore, the friction resistance of the abrading portion is reduced, thereby making it possible to smoothly move the lubricant retainer 24 in the frictionally sliding manner. Accordingly, the contact pressure of the solid lubricant 21 against the lubricant application brush roller 22 becomes even in the longitudinal direction.

The semicylindrical protruding members 24c extend beyond the upper surface of the lubricant retainer 24. Thus, when the solid lubricant 21 is consumed so that the solid lubricant is pressed upward, the solid lubricant 21 is stably held by the protruding members 24c provided on the left and the right sides having the predetermined height until the solid lubricant 21 is completely consumed.

Accordingly, the solid lubricant 21 is prevented, for example, from tilting in the rotation direction of the lubricant application brush roller 22. It is possible to maintain the position of the solid lubricant 21 facing the lubricant application brush roller 22 until the solid lubricant 21 is completely consumed. The solid lubricant 21 can be evenly consumed.

The amount of the lubricant applied to the photoreceptor 10 is stabilized so that it is possible to avoid the contamination of the devices provided nearby, for example, the charger, due to excess applied lubricant.

Furthermore, it is possible to suppress generation of the filming in which the toner particles adheres to the photoreceptor surface when the amount of the lubricant applied is significantly reduced.

The lubricant application blade 23 disposed downstream in the photoreceptor moving direction regulates the thickness of the lubricant applied to the surface of the photoreceptor 10. The photoreceptor 10 supplied with the lubricant is uniformly charged to the predetermined polarity by the charging roller 41 of the charger 40.

Accordingly, a similar if not the same operation as described above is repeated to form an image.

In the exemplary embodiment described above, zinc stearate (ZnSt) is used as the lubricant. Alternatively, however, a lubricant of calcium stearate (CaSt) or any other suitable material may be used.

Similarly, in the exemplary embodiment described above, the brush roller 22 is employed as the lubricant application mechanism. However, instead of the brush roller, the lubricant application mechanism may be, for example, a sponge roller, a nonwoven roller, or the like.

In the exemplary embodiment described above, it is preferable to satisfy a relation $$\mu t > \mu s$$

where $\mu t$ is a friction coefficient of the lubricant carrier 24d which carries the lubricant 21 and $\mu s$ is a friction coefficient of the resin member 24a.

Accordingly, a suitable material can be employed for each device so as to ensure adequate slippage with the lubricant holder 25 and retention of the lubricant 21.

Further, according to the exemplary embodiment described above, the protruding members serving as the friction resistance reduction mechanism are provided on the end surfaces of the lubricant retainer 24 in the longitudinal direction, and to the side surfaces of the lubricant retainer 24 near the end surfaces thereof.

However, the present invention is not limited to such an arrangement, and therefore the protruding members serving as the friction resistance reduction mechanism may be provided only on the end surfaces of the lubricant retainer 24 in the longitudinal direction, or only on the side surfaces near the end surfaces, or only on one side surface of the lubricant retainer 24. Alternatively, the friction resistance reduction mechanism may be provided on the inner wall of the lubricant holder 25.

It should be noted, however, that the present invention is not limited to these embodiments, and various variations and modifications may be made without departing from the scope of the present invention.

Further, elements and/or features of different exemplary embodiments may be combined with each other and/or substituted for each other within the scope of this disclosure and appended claims.

Any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the spirit and scope of the present invention, and all such modifications as would be obvious to one skilled in the art are intended to be included within the scope of the following claims.

The number of constituent elements, locations, shapes and so forth of the constituent elements are not limited to any of the structure for performing the methodology illustrated in the drawings.

What is claimed is:

1. A lubricant applicator, comprising:
   a solid lubricant;
   a lubricant retainer configured to hold the solid lubricant;
   a lubricant holder configured to store the solid lubricant and the lubricant retainer and configured to frictionally slide against the lubricant retainer;
   a lubricant application mechanism configured to apply the solid lubricant to an object;
   a pressure mechanism provided between and contacting the lubricant retainer and the lubricant holder, the pressure mechanism configured to press the lubricant retainer so as to push the solid lubricant from the lubricant holder; and
   a plurality of friction resistance reduction members provided at a position where the lubricant retainer and the lubricant holder contact each other in a frictionally sliding manner, wherein
   the lubricant retainer includes first surfaces at both ends of the lubricant retainer in a longitudinal direction thereof and second surfaces at both sides of the lubricant retainer near the first surfaces,
   the friction resistance reduction member is provided on a first and second position, the first position being an area of contact between the first surfaces and the inner wall of the lubricant holder, and the second position being an area of contact between the second surfaces and the inner wall of the lubricant holder,
   at least one of the friction resistance reduction members includes a first protrusion extending along a sliding direction of the lubricant holder,
   the friction resistance reduction member provided on the first surfaces is a second protrusion configured to point-contact with the inner wall of the lubricant holder, and
   the friction resistance reduction member provided on the second surfaces is the first protrusion configured to contact in line with the inner wall of the lubricant holder.

2. The lubricant applicator according to claim 1, wherein the first protrusion is provided on the outside of an end portion of the solid lubricant in the longitudinal direction of the lubricant holder.

3. The lubricant applicator according to claim 1, wherein the first protrusion extends upward above the lubricant retainer or an upper surface of the lubricant holder.

4. The lubricant applicator according to claim 1, wherein the lubricant retainer comprises a carrier configured to carry at least the lubricant and an abrading member configured to contact the lubricant holder in a frictionally sliding manner.

5. The lubricant applicator according to claim 4, wherein the following relation is satisfied:

$$\mu t > \mu s,$$

where $\mu t$ is a friction coefficient of the carrier and $\mu s$ is a friction coefficient of the abrading member.

6. The lubricant applicator according to claim 4, wherein the abrading member is made of resin.

7. The lubricant applicator according to claim 6, wherein the abrading member is made of polyacetal.

8. The lubricant applicator according to claim 6, wherein the abrading member comprises the friction resistance reduction member including at least one of the first protrusion and the second protrusion,
   wherein the at least one of the first protrusion and the second protrusion is integrally formed with the abrading member.

9. The lubricant applicator according to claim 4, wherein the abrading member is detachably mountable on the carrier.

10. The lubricant applicator according to claim 1, wherein both ends of the lubricant retainer are made of resin, and the second protrusion of the friction resistance reduction member is integrally formed with the both ends of the lubricant retainer.

11. The lubricant applicator according to claim 1, wherein the pressure member comprises:
    a pair of cam members provided on an opposite surface of a lubricant holding surface of the lubricant retainer with a predetermined gap between the cam members; and
    a spring member provided between the cam members, configured to bias the cam members so that the gap between the cam members is reduced, and
    wherein the pressure member is configured to lift the cam members so as to press end portions of the cam members against a bottom surface of the lubricant holder and a reactive force extrudes the solid lubricant.

12. A process cartridge detachably mountable to an image forming apparatus, the process cartridge comprising:
    an image carrier including a surface that bears an electrostatic latent image;
    at least one of a charger configured to charge the surface of the image carrier, a developing mechanism configured to supply toner to the electrostatic latent image on the surface of the image carrier so as to form a visible image, and a cleaner configured to recover a residual toner remaining on the surface of the image carrier after transfer; and
    a lubricant applicator,
    the lubricant applicator comprising:
        a solid lubricant;
        a lubricant retainer configured to hold the solid lubricant;
        a lubricant holder configured to store the solid lubricant and the lubricant retainer and configured to frictionally slide against the lubricant retainer;
        a lubricant application mechanism configured to apply the solid lubricant to an object;
        a pressure mechanism provided between and contacting the lubricant retainer and the lubricant holder, the pressure mechanism configured to press the lubricant retainer so as to push out the solid lubricant from the lubricant holder; and a plurality of friction resistance reduction members provided at a position where the lubricant retainer and the lubricant holder contact each other in a frictionally sliding manner, wherein the lubricant retainer includes first surfaces at both ends of the lubricant retainer in a longitudinal direction thereof and second surfaces at both sides of the lubricant retainer near the first surfaces, the friction resistance reduction member is provided on a first and second position, the first position being an area of contact between the first surfaces and the inner wall of the lubricant holder, and the second position being an area of contact between the second surfaces and the inner wall of the lubricant holder, at least one of the friction resistance reduction members includes a first protrusion extending along a sliding direction of the lubricant holder, the friction resistance reduction member provided on the first surfaces is a second protrusion configured to point-contact with the inner wall of the lubricant holder, and the friction resistance reduction member provided on the second surfaces is the first protrusion configured to contact in line with the inner wall of the lubricant holder.

13. An image forming apparatus, comprising:
an image carrier;
a charger configured to charge a surface of the image carrier;
an exposure unit configured to irradiate the surface of the image carrier based on image information so as to form an electrostatic latent image thereon;
a developing mechanism configured to supply toner to the electrostatic latent image on the surface of the image carrier so as to form a visible image;
a transfer unit configured to transfer the visible image onto a recording medium directly or indirectly through an intermediate transfer medium that moves while contacting the image carrier; and
a cleaner configured to recover a residual toner remaining on the surface of the image carrier after transfer,
wherein the image forming apparatus further comprises at least one of a lubricant applicator and a process cartridge detachably mountable to the image forming apparatus,
the lubricant applicator including:
a solid lubricant,
a lubricant retainer configured to hold the solid lubricant,
a lubricant holder configured to store the solid lubricant and the lubricant retainer and configured to frictionally slide against the lubricant retainer,
a lubricant application mechanism configured to apply the solid lubricant to an object,
a pressure mechanism provided between and contacting the lubricant retainer and the lubricant holder, the pressure mechanism configured to press the lubricant retainer so as to push out the solid lubricant from the lubricant holder, and
a plurality of friction resistance reduction members provided at a position where the lubricant retainer and the lubricant holder contact each other in a frictionally sliding manner, wherein
the lubricant retainer includes first surfaces at both ends of the lubricant retainer in a longitudinal direction thereof and second surfaces at both sides of the lubricant retainer near the first surfaces,
the friction resistance reduction member is provided on a first and second position, the first position being an area of contact between the first surfaces and the inner wall of the lubricant holder, and the second position being an area of contact between the second surfaces and the inner wall of the lubricant holder,
at least one of the friction resistance reduction members includes a first protrusion extending along a sliding direction of the lubricant holder,
the friction resistance reduction member provided on the first surfaces is a second protrusion configured to point-contact with the inner wall of the lubricant holder, and
the friction resistance reduction member provided on the second surfaces is the first protrusion configured to contact in line with the inner wall of the lubricant holder,
the process cartridge including:
an image carrier including a surface that bears an electrostatic latent image, and
the process cartridge integrally including at least one of:
a charger configured to charge the surface of the image carrier,
a developing mechanism configured to supply toner to the electrostatic latent image on the surface of the image carrier so as to form a visible image, and
a cleaner configured to recover a residual toner remaining on the surface of the image carrier after transfer, and the lubricant applicator.

* * * * *